United States Patent
Wang et al.

(10) Patent No.: US 11,463,640 B1
(45) Date of Patent: Oct. 4, 2022

(54) BITLINE CONTROL SUPPORTING BINNING MODE PHASE DETECTION AUTOFOCUS PHOTODIODES

(71) Applicant: OMNIVISION TECHNOLOGIES, INC., Santa Clara, CA (US)

(72) Inventors: Rui Wang, San Jose, CA (US); Zheng Yang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/339,701

(22) Filed: Jun. 4, 2021

(51) Int. Cl.
| | |
|---|---|
| *H04N 5/347* | (2011.01) |
| *H04N 5/369* | (2011.01) |
| *H04N 5/374* | (2011.01) |
| *H04N 5/378* | (2011.01) |
| *H04N 5/232* | (2006.01) |
| *H04N 5/3745* | (2011.01) |

(52) U.S. Cl.
CPC ......... *H04N 5/36961* (2018.08); *H04N 5/347* (2013.01); *H04N 5/378* (2013.01); *H04N 5/37455* (2013.01)

(58) Field of Classification Search
CPC ............... H04N 5/347; H04N 5/36961; H04N 5/37455; H04N 5/378; H04N 5/232122; H04N 5/23227; H04N 5/52; H04N 5/53
See application file for complete search history.

(56) References Cited

U.S. PATENT DOCUMENTS

| | | | | |
|---|---|---|---|---|
| 2016/0344958 A1* | 11/2016 | Kondo | .................. | H04N 5/361 |
| 2017/0353679 A1* | 12/2017 | Negishi | .............. | H04N 5/35581 |
| 2018/0102389 A1* | 4/2018 | Lee | ........................ | H01L 27/146 |
| 2019/0068869 A1* | 2/2019 | Kadambala | ........ | H04N 5/23212 |
| 2020/0045251 A1* | 2/2020 | Koizumi | ................ | H04N 5/351 |
| 2020/0104034 A1* | 4/2020 | Lee | ...................... | G06F 3/04845 |
| 2020/0280692 A1* | 9/2020 | Akahane | ................ | H04N 5/378 |
| 2020/0314361 A1* | 10/2020 | Kim | ........................ | H04N 5/347 |
| 2020/0366863 A1* | 11/2020 | Etou | .................. | H04N 5/37455 |
| 2021/0337144 A1* | 10/2021 | Wang | ................. | H04N 5/36961 |
| 2022/0078364 A1* | 3/2022 | Kim | ........................ | H04N 5/369 |

OTHER PUBLICATIONS

Wang et al., U.S. Appl. No. 16/855,850, filed Apr. 22, 2020, 73 pages.

* cited by examiner

*Primary Examiner* — Marly S Camargo
(74) *Attorney, Agent, or Firm* — Perkins Coie LLP

(57) ABSTRACT

An imaging device includes pixel circuits that include either image sensing photodiodes or phase detection autofocus (PDAF) photodiodes. The PDAF photodiodes are included in a first PDAF pixel circuit included in a first grouping of rows, and a second PDAF pixel circuit included in a second grouping of rows of a pixel array. Bitline pairs are coupled to respective columns of the pixel array. Each bitline pair includes a first bitline coupled to the first grouping of rows and a second bitline coupled to the second grouping of rows of respective columns of the pixel array. Multiplexers are configured to select one of respective first or second bitlines of each bitline pair. A PDAF multiplexer is coupled to a PDAF select signal and the second PDAF circuit through a respective bitline pair. The remaining multiplexers are coupled to a select signal and are coupled to remaining bitline pairs.

31 Claims, 6 Drawing Sheets

BITLINE CONTROL SUPPORTING BINNING MODE PHASE DETECTION AUTOFOCUS PHOTODIODES

BACKGROUND INFORMATION

Field of the Disclosure

This disclosure relates generally to image sensors, and in particular but not exclusively, relates to image sensors that include phase detection autofocus photodiodes.

Background

Image sensors have become ubiquitous and are now widely used in digital cameras, cellular phones, security cameras as well as in medical, automotive, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing. The technology used to manufacture image sensors has continued to advance at a great pace. For example, the demands of higher resolution and lower power consumption have encouraged the further miniaturization and integration of these devices.

A typical complementary metal oxide semiconductor (CMOS) image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which are read out as analog signals from the column bitlines and converted to digital values to produce digital images (i.e., image data) that represent the external scene.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
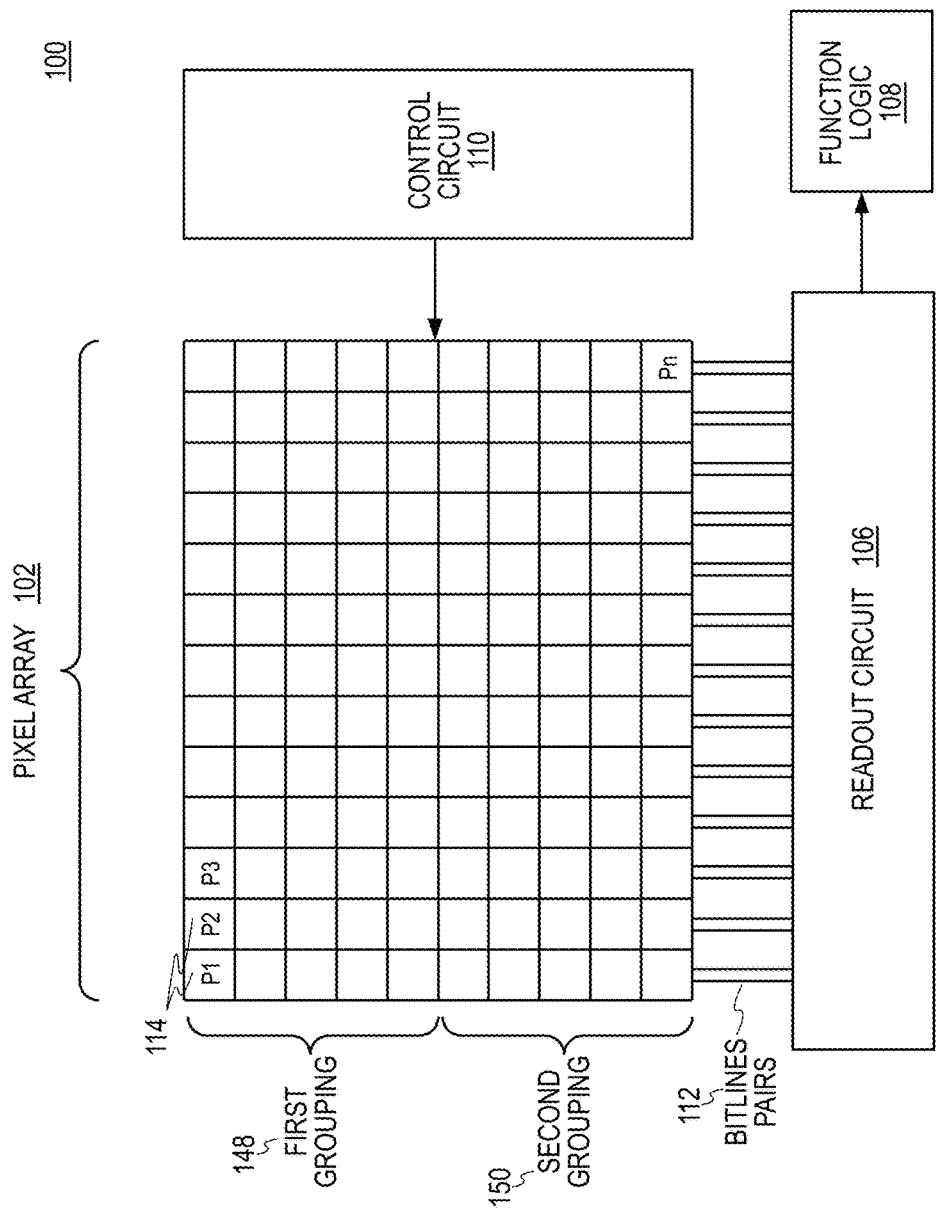
FIG. 1 illustrates one example of an imaging system with a pixel array including phase detection auto focus photodiodes interspersed among binned image sensing photodiodes in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to an imaging system including a pixel array with pixel circuits that include phase detection auto focus photodiodes, which are interspersed among pixel circuits that include binned image sensing photodiodes are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system include a pixel array with a plurality of pixel circuits arranged into rows and columns in the pixel array. The rows in the pixel array include a first grouping of rows and a second grouping of rows. In one example, the first grouping of rows includes rows in an upper portion or upper half of the pixel array, and the second grouping of rows includes rows in a lower portion or lower half of the pixel array. A plurality of photodiodes is included in each one of the plurality of pixel circuits. In the various examples, the plurality of photodiodes in the pixel array include image sensing photodiodes and phase detection autofocus (PDAF) photodiodes. The plurality of pixel circuits includes a first PDAF pixel circuit that includes at least a first pair of PDAF photodiodes, which is included in the first grouping of rows. The plurality of pixel circuits also includes a second PDAF pixel circuit including at least a second pair of PDAF photodiodes, which is included in the second grouping of rows. The first and second PDAF pixel circuits are interspersed in different columns among pixel circuits that include image sensing photodiodes in the pixel array. The imaging system also includes a plurality of bitline pairs. Each bitline pair is coupled to a respective column of pixel circuits in the pixel array. In the various examples, each bitline pair includes a first bitline coupled to the first grouping of rows of the respective column of the pixel array, and a second bitline coupled to the second grouping of rows of the respective column of the pixel array. The imaging system further includes a plurality of multiplexers. Each multiplexer includes first and second multiplexer inputs. Each multiplexer also has a select input configured to select one of the respective first and second multiplexer inputs, which are coupled to respective first and second bitlines of a respective bitline pair. The plurality of multiplexers includes a PDAF multiplexer, which is coupled to the second PDAF pixel circuit though a respective bitline pair. The select input of the PDAF multiplexer is coupled to receive a PDAF select signal, while the select input of remaining multiplexers of the plurality of multiplexers are coupled to receive a select signal. The imaging device also includes a plurality of analog to digital converters (ADC). Each ADC is coupled to an output of a respective one of the plurality of multiplexers to perform an analog to digital conversion of a signal on the output of the respective multiplexer. In operation, the imaging device is configured to read out rows of normal image sensing pixel circuits simultaneously, and then read out PDAF pixel circuits from the upper half and the lower half of the pixel array array simultaneously.

To illustrate, FIG. 1 illustrates one example of an imaging system 100 including an imaging device with phase detection autofocus photodiodes interspersed among binned image sensing photodiodes in accordance with the teachings of the present invention. In particular, imaging system 100 includes a pixel array 102, a control circuit 110, a readout circuit 106, and function logic 108. In one example, pixel array 102 is a two-dimensional (2D) array of pixel circuits 114, (e.g., P1, P2, . . . , Pn). As illustrated in the depicted example, the pixel circuits 114 are arranged into rows and columns in pixel array 102 to acquire image data or focus data of a person, place, object, etc., which can then be used to acquire and render a 2D image of the person, place, object, etc. As shown in the example depicted in FIG. 1, the rows of pixel array 102 are grouped into a first grouping of rows 148 and a second grouping of rows 150. In the example, the first grouping of rows 148 includes the rows that are included in an upper portion or upper half of pixel array 102, and the second grouping of rows 150 includes the rows that are included in a lower portion or lower half of pixel array 102.

As will be discussed in greater detail below, each pixel circuit 114 includes a plurality of photodiodes. In the various examples, the photodiodes in pixel array 102 may include either phase detection autofocus (PDAF) photodiodes or image sensing photodiodes. In the examples, the pixel circuits 114 that include PDAF photodiodes are interspersed among pixel circuits 114 that include image sensing photodiodes. In one example, a first PDAF pixel circuit that includes PDAF photodiodes is included in the first grouping of rows 148 in a first column of pixel array 102, and a second PDAF pixel circuit that includes PDAF photodiodes is included in the second grouping of rows 150 in a different second column of pixel array 102. In one example, each photodiode in pixel array 102 is configured to photogenerate image charge or PDAF charge in response to incident light.

The image charge or PDAF charge that is generated in each photodiode is transferred to a floating diffusion in each pixel circuit 114 through a respective transfer transistor. As will be shown in the various examples, it is appreciated that the transfer transistors coupled to the PDAF photodiodes may be controlled separately or independently from the transfer transistors that are coupled to image sensing photodiodes in the pixel array 102. The image charge or PDAF charge generated in each pixel circuit 114 is converted to an image signal or a PDAF signal, respectively, which is then read out from each pixel circuit 114 by readout circuit 106 through respective column bitline pairs 112. The image signals may be used to render the image of a person, place, object, etc., and the PDAF signal information may be used for autofocus operations of imaging system 100.

In the various example, a first bitline of each bitline pair 112 is coupled to the first grouping of rows 148 for each column of the pixel array 102, and a second bitline of each bitline pair 112 is coupled to the second grouping of rows 150 for each column of the pixel array 102. In the various example, a readout circuit 106 is coupled to the pixel 102 through the bitline pairs 112 to read signals out from pixel array 102. As will be discussed, the readout circuit 106 includes a plurality of multiplexers coupled to each respective column bitline pair 112. Each multiplexer has first and second multiplexer inputs coupled to respective first and second bitlines of each bitline pair 112 coupled to a respective column of pixel array 102. When reading out image signals from the pixel array 102, each multiplexer is configured to select the same bitline of the bitline pair 112 to readout all of the normal image sensing pixel circuits from the same row of the pixel array 102. However, when reading out PDAF signals from the pixel array 102, the multiplexers that are coupled to columns with PDAF pixel circuits are configured to select the PDAF pixel circuits through the different respective bitlines from the different groupings 148, 150 of the pixel array 102 so that all of the PDAF pixel circuits through the pixel array 102 are read out simultaneously.

In the example, the signals that are read out from pixel array 102 by readout circuit 106 may be amplified, digitized, and then transferred to function logic 108. As such, in the various examples, the readout circuit 106 includes amplification circuitry, analog to digital converters (ADCs), or otherwise in addition to the multiplexers that are coupled to the column bitline pairs 112. The function logic 108 may store the image data or even manipulate the image data by applying post image effects (e.g., crop, rotate, remove red eye, adjust brightness, adjust contrast, or otherwise).

Figure 2:
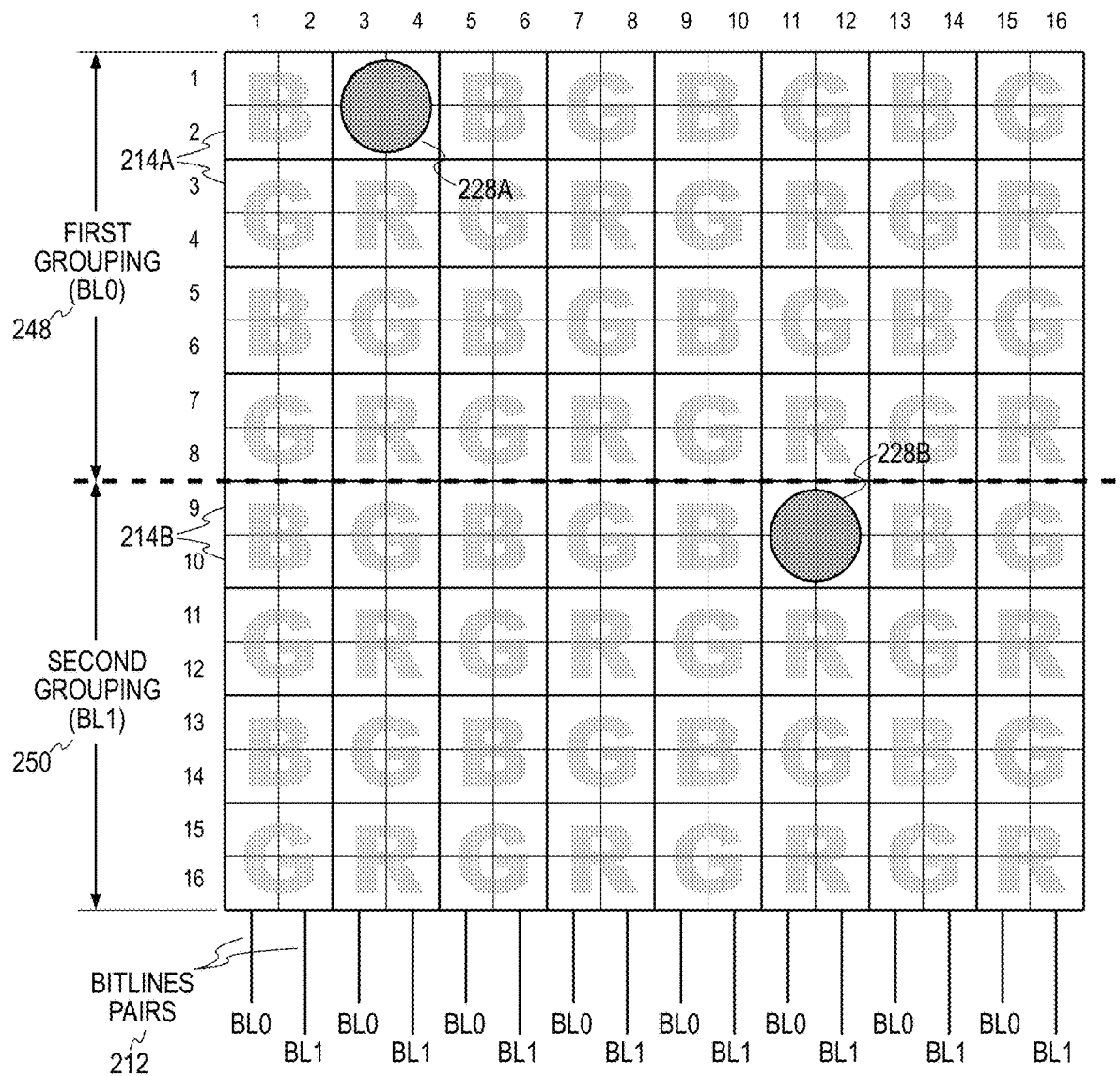
FIG. 2 illustrates greater detail of one example of a pixel array including phase detection autofocus photodiodes interspersed among binned image sensing photodiodes in accordance with the teachings of the present disclosure.

FIG. 2 illustrates greater detail of one example of a pixel array 202 including phase detection autofocus photodiodes interspersed among binned image sensing photodiodes in accordance with the teachings of the present invention. It is appreciated that the pixel array 202 of FIG. 2 may be an example showing greater detail of pixel array 102 as shown in FIG. 1, and that similarly named and numbered elements described above are coupled and function similarly below.

As shown in the example depicted in FIG. 2, pixel array 202 includes a plurality of pixel circuits 214A, 214B arranged into rows and columns in pixel array 202. In the depicted example, the rows of pixel array 202 are grouped into a first grouping of rows 248 and a second grouping of rows 250. In the illustrated example, the first grouping of rows 248 include the rows that are in the upper portion or upper half of pixel array 202 and the second grouping of rows 250 include the rows that are in the lower portion or lower half of pixel array 202. As shown in the example, the pixel circuits that are included in the first grouping of rows 248 are labeled pixel circuits 214A and the pixel circuits that are included in the second grouping of rows 248 are labeled pixel circuits 214B.

In one example, each of the pixel circuits 214A, 214B includes a plurality of photodiodes. In the various examples, the plurality of photodiodes in the pixel array 202 include image sensing photodiodes and phase detection autofocus (PDAF) photodiodes. In the depicted example, each pixel circuit 214A, 214B includes either image sensing photodiodes or PDAF photodiodes. As shown in the depicted example, the photodiodes are arranged in binned 2×2 groupings in each pixel circuit 214A, 214B as shown. Thus, each pixel circuit 214A, 214B as illustrated in the example FIG. 2 includes 2 columns and 2 rows of photodiodes. It is noted therefore that FIG. 2 also illustrates multiple columns of photodiodes in pixel array 202, which are numbered from "1" to "16" and multiple rows of photodiodes, which are numbered from "1" to "16" as shown. As such, the pixel circuit 214A in the upper left hand corner of pixel array 202 of FIG. 2 includes columns "1" and "2" of photodiodes and rows "1" and "2" of photodiodes, etc.

In one example, a color filter array is disposed over the pixel array 202. In the example, the color filter array is disposed over the pixel circuits 214A, 214B of pixel array 202 that include image sensing photodiodes. In one example, the color filter array includes a plurality of color filters that are arranged in a Bayer pattern over the image sensing photodiodes of the pixel circuits 214A, 214B. For instance, as shown in the example depicted in FIG. 2, the color filter array is a 4C color filter array that includes red (R), green (G), and blue (B) color filters, with each color filter disposed over a respective 2×2 grouping of binned image sensing photodiodes of pixel circuits 214A, 214B. As such, the binned 2×2 grouping of image sensing photodiodes of each of the pixel circuits 214A, 214B that include image sensing photodiodes are configured to be illuminated with incident light through respective red (R), green (G), and blue (B) color filters having a same color.

As mentioned above, it is appreciated that the photodiodes included in the pixel circuits 214A, 214B of the pixel array 202 are binned. As such, information that is generated from each photodiode is summed or combined with information generated from one or more nearby binned photodiodes to generate combined information, and therefore sum the performance of each individual photodiode to improve the performance of the pixel array 202. For instance, in the example depicted in FIG. 2, the 2×2 groupings of photodiodes are configured to be binned such that the 4 photodiodes included in each 2×2 grouping all share the same color. In other words, the photodiodes are arranged in the pixel array 202 such that each 2×2 grouping of image sensing photodiodes is either red (R), green (G), or blue (B). As shown, the 2×2 groupings of binned photodiodes in each pixel circuit 214A, 214B are all adjacent photodiodes in the pixel array 202 and share the same color filter.

The example depicted in FIG. 2 also illustrates that pixel circuits 214A, 214B may include PDAF photodiodes, which are disposed under PDAF microlenses 228A, 228B in pixel array 202. In particular, the depicted example shows a PDAF microlens 228A, which in the example is disposed over a first PDAF pixel circuit that includes a first 2×2 grouping of PDAF photodiodes in the first grouping of rows 248, and located in the 3rd and 4th columns and 1st and 2nd rows of photodiodes in the pixel array 202. In addition, the depicted example also shows a PDAF microlens 228B, which in the example is disposed over a second PDAF pixel circuit that includes a second 2×2 grouping of PDAF photodiodes in the second grouping of rows 250, and located in the 11th and 12th columns and 9th and 10th rows of photodiodes in the pixel array 202. In operation, the first PDAF pixel circuit is illuminated with incident light directed through PDAF microlens 228A and the second PDAF pixel circuit is illuminated with incident light directed through PDAF microlens 228B. It is further appreciated that the 2×2 groupings of PDAF photodiodes for the first PDAF pixel circuit and the second PDAF pixel circuit illustrated in FIG. 2 are interspersed in different columns among the pixel circuits 214A, 214B that include image sensing photodiodes in the pixel array 202.

In operation, PDAF information is retrieved from pixel 202 by comparing or evaluating the PDAF signals from one side of the 2×2 groupings of the PDAF photodiodes (e.g., under each PDAF microlens 228A, 228B) with PDAF signals from the other side of the groupings of the PDAF photodiodes. For instance, in one example, the PDAF signals from horizontally adjacent pairs are compared. In other words, the left side pair (e.g., left half) of PDAF photodiodes are compared with the PDAF signals from the right side pair (e.g., right half) of PDAF photodiodes of the 2×2 groupings of PDAF photodiodes. In another example, the PDAF signals from vertically adjacent pairs may be compared. In other words, the top side pair (e.g., top half) of PDAF photodiodes are compared with the PDAF signals from the bottom side pair (e.g., bottom half) of photodiodes of the 2×2 groupings of PDAF photodiodes. In still another example with 2×1 groupings of PDAF photodiodes (not shown in FIG. 2), the PDAF signals from the left side or top side (e.g., left half or top half) PDAF photodiodes are compared with the PDAF signals from the right side or bottom side (e.g., right half or bottom half) PDAF photodiodes of the 2×1 groupings of PDAF photodiodes.

It is noted that although the first and second PDAF pixel circuits that are disposed under the PDAF microlenses 228A and 228B, respectively, are illustrated as including 2×2 groupings of photodiodes, it is appreciated that in other examples, the PDAF pixel circuits may include a different number of photodiodes having at least a pair of PDAF photodiodes (e.g., a 2×1 grouping of at least a horizontally adjacent pair of neighboring PDAF photodiodes or at least a vertically adjacent pair of neighboring PDAF photodiodes).

It is further noted that although FIG. 2 illustrates the PDAF microlenses 228A, 228B over the underlying 2×2 groupings of PDAF photodiodes for explanation purposes, it is appreciated that the normal image sensing photodiodes that are under the color filters (e.g., R, G, B) are also under respective microlenses, which are not shown in FIG. 2 so as not to obscure the teachings of the present invention. In one example, the microlenses for the normal image sensing photodiodes may only cover a 1×1 photodiode area.

The example depicted in FIG. 2 also illustrates a plurality of bitline pairs 212, with each bitline pair coupled to a respective column of pixel circuits 214A, 214B in pixel array 202. Each one of the bitline pairs 212 includes a first bitline BL0 and a second bitline BL1. In the various examples, the first bitline BL0 is coupled to the pixel circuits 214A in the first grouping of rows 248 the respective column of pixel array 202. For instance, in the example, the first bitline BL0 of each bitline pair 212 is coupled to pixel circuits 214A that are included in the upper half (e.g., pixel circuits 214A that include rows 1-8 of photodiodes in FIG. 2) of pixel array 202 in the respective column. In the various examples, the second bitline BL1 of each bitline pair 212 is coupled to the pixel circuits 214B in the second grouping of rows 250 the respective column of pixel array 202. For instance, in the example, the second bitline BL1 of each bitline pair 212 is coupled to pixel circuits 214B that are included in the lower half (e.g., pixel circuits 214B that include rows 9-16 of photodiodes in FIG. 2) of pixel array 202 in the respective column.

As will be discussed in greater detail below, a multiplexer is coupled to each bitline pair 212 to select the either the first bitline BL0 or the second bitline BL1 when reading out image signals from pixel array 202, depending on which rows of normal image sensing photodiodes are being read out from pixel array 202. Furthermore, as will be discussed in greater detail below, the multiplexers are also configured to select the first or second bitline BL0 or BL1 when reading out PDAF information pixel array 202. In one example, all of the PDAF pixel circuits may be read out from pixel array 202 simultaneously, irrespective of which rows the PDAF pixel circuits are located in pixel array 202 in accordance with the teachings of the present invention.

Figure 3:
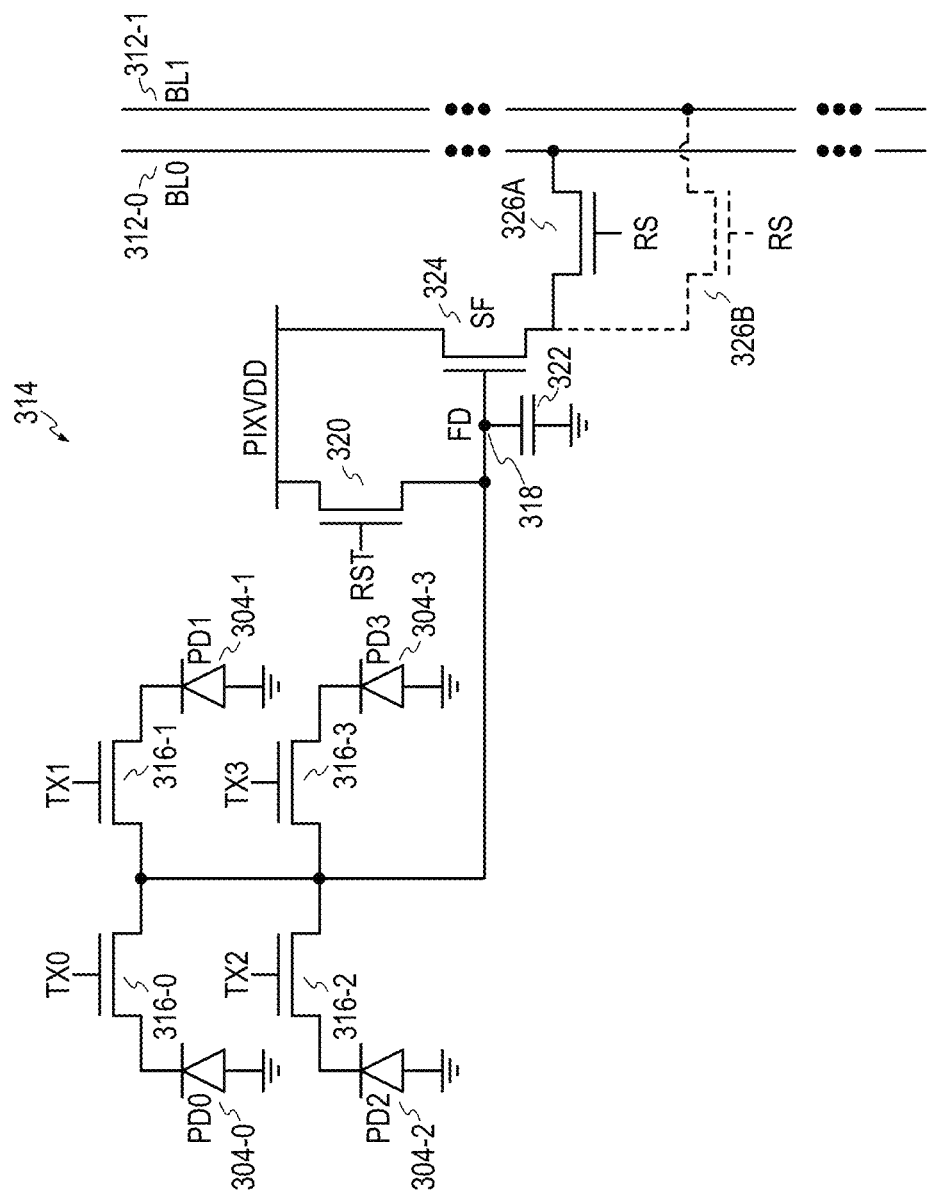
FIG. 3 illustrates one example of a pixel circuit included in an imaging system with a pixel array including phase detection auto focus photodiodes interspersed among binned image sensing photodiodes in accordance with the teachings of the present invention.

FIG. 3 illustrates one example of a pixel circuit 314 included in an imaging system with a pixel array including phase detection auto focus photodiodes interspersed among binned image sensing photodiodes in accordance with the teachings of the present invention. It is appreciated the pixel circuit 314 of FIG. 3 may be an example of one of the pixel circuits 214A, 214B included in pixel array 202 as shown in FIG. 2, or an example of one of the pixel circuits 114 included in pixel array 102 as shown in FIG. 1, and that similarly named and numbered elements described above are coupled and function similarly below.

In the example depicted in FIG. 3, pixel circuit 314 includes a plurality of photodiodes including a photodiode 304-0 coupled to a transfer transistor 316-0, a photodiode 304-1 coupled to a transfer transistor 316-1, a photodiode 304-2 coupled to a transfer transistor 316-2, and a photodiode 304-3 coupled to a transfer transistor 316-3. Thus, each one of the plurality of transfer transistors 316-0 to 316-3 is coupled to a respective one of the plurality of photodiodes 304-0 to 304-3. As shown in the depicted example, photodiodes 304-0 to 304-3 are arranged in a 2×2 grouping. In other examples, it is appreciated that the photodiodes may be arranged in different groupings having different arrangements.

In the example, a floating diffusion 318 is coupled to transfer transistor 316-0, transfer transistor 316-1, transfer transistor 316-2, and transfer transistor 316-3. As such, each one of the plurality of transfer transistors 316-0 to 316-3 is coupled between a respective one of the plurality of photodiodes 304-0 to 304-3 and floating diffusion 318. As will be discussed in the various examples, floating diffusion 318 is a floating diffusion that is configured to receive charge that is transferred from the plurality of photodiodes 304-0 to 304-3. In one example, a floating diffusion capacitor 322 is coupled to the floating diffusion 318 as shown.

In operation, transfer transistor 316-0 is coupled to be controlled in response to a transfer control signal TX0, transfer transistor 316-1 is coupled to be controlled in response to a transfer control signal TX1, transfer transistor 316-2 is coupled to be controlled in response to a transfer control signal TX2, and transfer transistor 316-3 is coupled to be controlled in response to a transfer control signal TX3. As such, charge photogenerated in photodiode 304-0 in response to incident light is transferred to floating diffusion 318 in response to transfer control signal TX0, charge photogenerated in photodiode 304-1 in response to incident light is transferred to floating diffusion 318 in response to transfer control signal TX1, charge photogenerated in photodiode 304-2 in response to incident light is transferred to floating diffusion 318 in response to transfer control signal TX2, and charge photogenerated in photodiode 304-3 in response to incident light is transferred to floating diffusion 318 in response to transfer control signal TX3.

In the various examples, it is appreciated that the plurality of photodiodes 304-0 to 304-3 may be configured as either PDAF photodiodes or as image sensing photodiodes depending on the specific location of the pixel circuit 314 and the plurality of photodiodes 304-0 to 304-3 within the pixel array (e.g., pixel array 202 in FIG. 2). As will be discussed in greater detail below, in the various examples, the transfer transistors 316-0 to 316-3 that are coupled photodiodes 304-0 to 304-3 that are configured as PDAF photodiodes are separately controlled from the photodiodes 304-0 to 304-3 that are configured as image sensing photodiodes. Furthermore, the photodiodes 304-0 to 304-3 that are configured as PDAF photodiodes are disposed under respective PDAF microlenses (e.g., microlenses 228A, 228B in FIG. 2) while the photodiodes 304-0 to 304-3 that are configured as image sensing photodiodes are disposed under respective color filters (e.g., R, G, B in FIG. 2) and microlenses.

In the various examples, the incident light that is directed to the photodiodes 304-0 to 304-3 that are configured as image sensing photodiodes is directed through respective microlenses and color filters (e.g., R, G, B of FIG. 2) of the color filter array before reaching the photodiodes 304-0 to 304-3. Thus, the incident light may be directed through a red (R) color filter, or a green (G) color filter, or a blue (B) color filter before reaching the photodiodes 304-0 to 304-3 that are configured as image sensing photodiodes. The incident light that is directed to the photodiodes 304-0 to 304-3 that are configured as PDAF photodiodes is directed through the PDAF microlens (e.g., microlenses 228A, 228B of FIG. 2) prior reaching the respective photodiodes 304-0 to 304-3. In the various examples, other than the incident light being directed through either a color filter or through a microlens 228A, 228B, the photodiodes 304-0 to 304-3 are otherwise substantially similar.

Continuing with the example depicted in FIG. 3, a reset transistor 320 is coupled between a voltage supply (e.g., PIXVDD) and the floating diffusion 318. In operation, the reset transistor 320 is configured to reset pixel circuit 314 including the charge in floating diffusion 318 in response to a reset control signal RST.

As shown in the depicted example, a gate of a source follower transistor 324 is coupled to the floating diffusion 318. In the example, the drain of the source follower transistor 324 is coupled to the voltage supply (e.g., PIXVDD), and the source of source follower transistor 324 is coupled to one of the bitlines of a column bitline pair, which includes a first bitline BL0 312-0 and second bitline BL1 312-1, through a row select transistor 326. Thus, in other words, the source follower transistor 324 and the row select transistor 326 are coupled between the voltage supply (e.g., PIXVDD) and the column bitline pair that includes first and second bitlines BL0 312-0 and BL1 312-1.

As discussed above, if pixel circuit 314 is located in the first grouping of rows 248 in FIG. 2, the source follower transistor 324 is coupled to first bitline BL0 312-0 through a row select transistor 326A as shown. If pixel circuit 314 is located in the second grouping of rows 250 in FIG. 2, the source follower transistor 324 is coupled to second bitline BL1 312-1 through a row select transistor 326B as shown. In the various examples, it is appreciated that pixel circuit 314 includes only one of the two row select transistors 326A, 326B illustrated in FIG. 3 depending on which bitline the source follower transistor 324 is coupled to. In operation, the row select transistor 326A or 326B is configured to output a signal (e.g., image data from image sensing photodiodes or PDAF data from PDAF photodiodes) from the source follower transistor 324 of pixel circuit 314 to column bitline BL0 312-0 or BL1 312-1 in response to a row select signal RS.

Figure 4A:
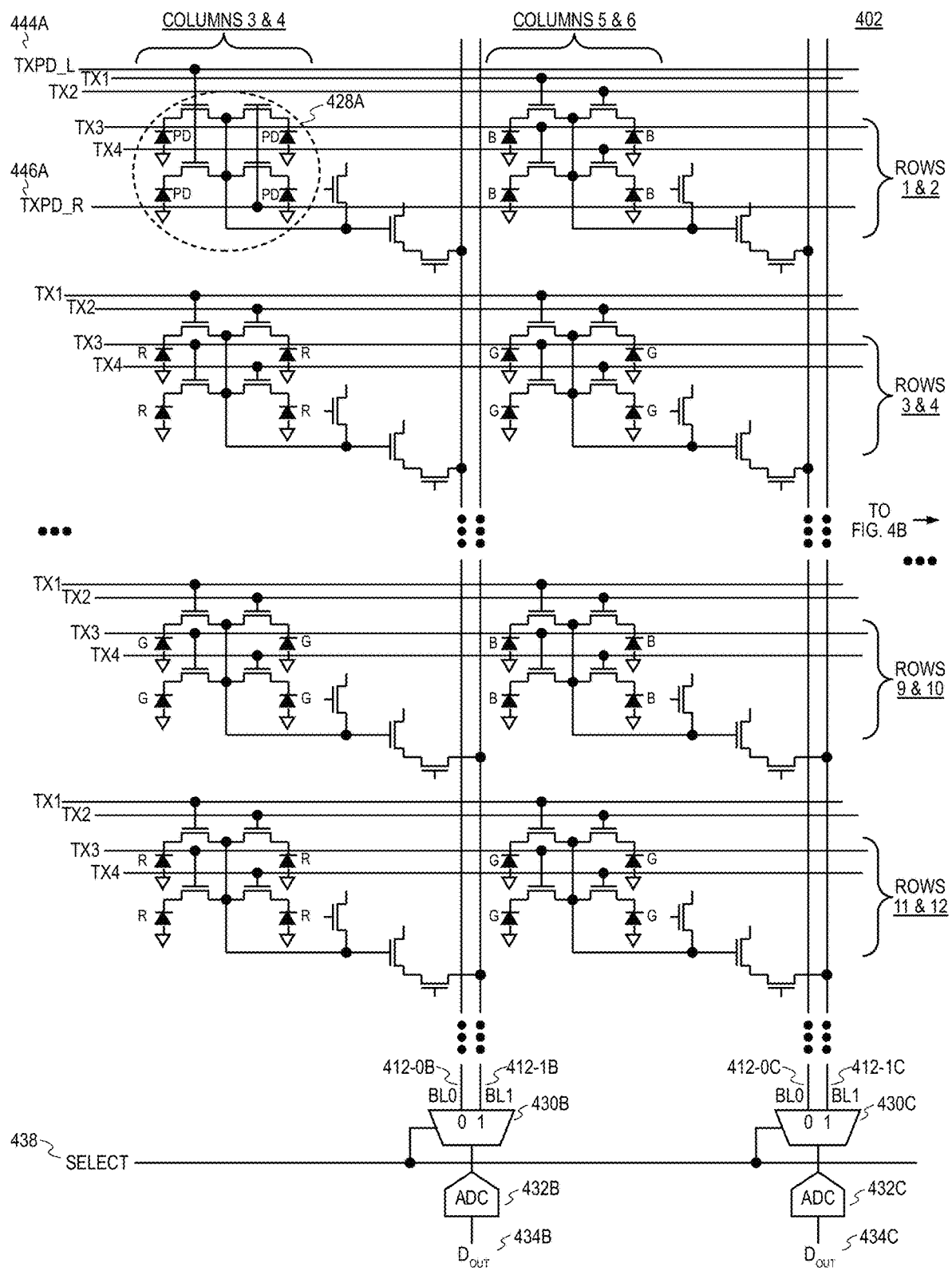
FIG. 4A illustrates one example of several rows and columns of pixel circuits included in a pixel array with phase detection auto focus photodiodes in an upper half of the pixel array and interspersed among binned image sensing photodiodes in accordance with the teachings of the present invention.

FIG. 4A illustrates one example of several rows and columns of pixel circuits included in a portion of a pixel array 402 with PDAF photodiodes in an upper half (e.g., first grouping of rows) of the pixel array 402 and interspersed among binned image sensing photodiodes in accordance with the teachings of the present invention. It is appreciated that the pixel array 402 of FIG. 4A may be an example of pixel array 202 as shown in FIG. 2, or of pixel array 102 as shown in FIG. 1, and that similarly named and numbered elements described above are coupled and function similarly below. Furthermore, it is appreciated that the pixel circuits illustrated in FIG. 4A may be examples of the pixel circuits 314 of FIG. 3, or examples of one of the pixel circuits 214A, 214B included in pixel array 202 as shown in FIG. 2, or an example of one of the pixel circuits 114 included in pixel array 102 as shown in FIG. 1, and that similarly named and numbered elements described above are coupled and function similarly below.

In particular, the portion of the example pixel array 402 illustrated in FIG. 4A illustrates four columns of photodiodes that may correspond to columns 3 and 4, and columns 5 and 6 of the columns of photodiodes described in FIG. 2. Furthermore, the portion of the example pixel array 402 illustrated in FIG. 4A illustrates eight rows of photodiodes that may correspond to rows 1 and 2, rows 3 and 4, rows 9 and 10, and rows 11 and 12 of the rows of photodiodes described in FIG. 2.

The depicted example also illustrates that the photodiodes are organized into pixel circuits with 2×2 groupings that are configured to be binned such that the four image sensing photodiodes in each 2×2 grouping all share the same color filter. In particular, the example depicted in FIG. 4A shows that the 2×2 groupings of image sensing photodiodes in columns 3 and 4 in rows 3 and 4, and in rows 11 and 12 are configured to be illuminated with red (R) light. Similarly, the 2×2 groupings of image sensing photodiodes in columns 3 and 4 in rows 9 and 10, and in columns 5 and 6 in rows 3 and 4, and in rows 11 and 12 are configured to be illuminated with green (G) light. Similarly, the 2×2 groupings of image sensing photodiodes in columns 5 and 6 in rows 1 and 2, and in rows 9 and 10 are configured to be illuminated with blue (B) light. As shown in the depicted example, it is appreciated that all of the transfer transistors of the image sensing pixel circuits of the same rows are coupled to be controlled with the same transfer transistor control signals TX1, TX2, TX3, and TX4 for each respective row.

As such, when the normal image sensing photodiodes of the image sensing pixel circuits are read out, the same transfer transistor control signals TX1, TX2, TX3, and TX4 of each respective row are configured to control the transfer transistors to transfer charge from the respective photodiodes to the floating diffusion together for all of the normal image sensing pixel circuits that are in the same rows as described in detail above in FIG. 3.

The example depicted in FIG. 4A also shows that there is a first PDAF pixel circuit including the 2×2 grouping of PDAF photodiodes in columns 3 and 4 in rows 1 and 2, which are disposed under a PDAF microlens 428A. It is noted that the transfer transistors of the first PDAF pixel circuit are separately controlled from the transfer transistors included in the normal image sensing pixel circuits described above. Instead, the transfer transistors of the first PDAF pixel circuit are configured to be controlled in response to PDAF transfer transistor control signals TXPD_L 444A and TXPD_R 446A instead of being controlled by the normal image sensing transfer transistor control signals TX1, TX2, TX3, and TX4. Therefore, it is appreciated that the PDAF photodiodes included in the 2×2 grouping of PDAF photodiodes in columns 3 and 4 in rows 1 and 2 are controlled and read out independently from the image sensing photodiodes that are controlled or read out in response to the normal image sensing transfer transistor control signals TX1, TX2, TX3, and TX4. In operation, it is noted that a first PDAF readout may be performed by reading out the left half PDAF photodiodes (e.g., the PDAF photodiodes column 3, rows 1 and 2) in response to the PDAF transfer transistor control signal TXPD_L 444A, and then a second PDAF readout may be performed by reading out the right half PDAF photodiodes (e.g., the PDAF photodiodes in column 4, rows 1 and 2) in response to the PDAF transfer transistor control signal TXPD_R 446A.

As shown in the depicted example, the column of pixel circuits that includes columns 3 and 4 of the photodiodes is coupled to a first bitline pair, which includes a first bitline BL0 412-0B and a second bitline BL1 412-1B. The column of pixel circuits that includes columns 5 and 6 of the photodiodes are coupled to a second bitline pair, which includes a first bitline BL0 412-0C and a second bitline BL1 412-1C. Similar to the example depicted in FIG. 2, rows 1 through 8 of the photodiodes are included in the first grouping of rows (e.g., 248 in FIG. 2) of pixel array 402, and rows 9 through 16 of the photodiodes are included in the second grouping of rows (e.g., 250) of pixel array 402. As such, the source follower transistors in the pixel circuits in the first grouping of rows (e.g., rows 1 and 2, and rows 3 and 4 in FIG. 4A) are coupled to the first bitlines BL0 412-0B and BL0 412-0C of the respective bitline pairs. As such, it is noted that the first PDAF pixel circuit, which includes the PDAF photodiodes in columns 3 and 4 and rows 1 and 2, is therefore located in the first grouping of rows. Similarly, the source follower transistors in the pixel circuits in the second grouping of rows (e.g., rows 9 and 10, and rows 11 and 12 in FIG. 4A) are coupled to the second bitlines BL1 412-1B and BL1 412-1C of the respective bitline pairs.

The example depicted in FIG. 4A also shows that there is a plurality of multiplexers, which includes multiplexer 430B and multiplexer 430C. In one example, the plurality of multiplexers are included in the readout circuit, such as readout circuit 106 shown in FIG. 1. Each multiplexer 430B, 430C is coupled to a respective bitline pair as shown. In particular, the example depicted in FIG. 4A shows that multiplexer 430B includes a first multiplexer input coupled to receive first bitline BL0 412-0B, and a second multiplexer input coupled to receive second bitline BL1 412-1B from the column of pixel circuits that include the photodiodes in columns 3 and 4 of pixel array 402. Similarly, multiplexer 430C includes a first multiplexer input coupled to receive first bitline BL0 412-0C, and a second multiplexer input coupled to receive second bitline BL1 412-1C from the column of pixel circuits that include the photodiodes in columns 5 and 6 of pixel array 402. As shown in the example, each of the multiplexers, including multiplexer 430B and 430C, includes a select input.

In the depicted example, multiplexer 430B and 430C are both coupled to receive select signal 438, which is configure to select one of the two respective multiplexer inputs to couple to a respective output of each multiplexer. In operation, the select signal 438 is configured to select the first bitline BL0 412-0B, 412-0C of each bitline pair when reading out rows of pixel circuits in the first grouping of rows (e.g., rows 1 through 8) of pixel array 402. The select signal 438 is configured to select the second bitline BL1 412-1B, 412-1C of each bitline pair when reading out rows of pixel circuits in the second grouping of rows (e.g., rows 9 through 16) of pixel array 402.

The example depicted in FIG. 4A also shows that there is a plurality of analog to digital converters (ADCs), which include ADC 432B and ADC 432C. In one example, the plurality of ADCs are included in the readout circuit, such as readout circuit 106 shown in FIG. 1. Each ADC is coupled to the output of a respective multiplexer 430B and 430C. In operation, each ADC 432B, 432C is configured to perform an analog to digital conversion of the analog output received from respective multiplexers 430B, 430C to generate respective digital outputs $D_{OUT}$ 434B, $D_{OUT}$ 434C as shown.

Figure 4B:
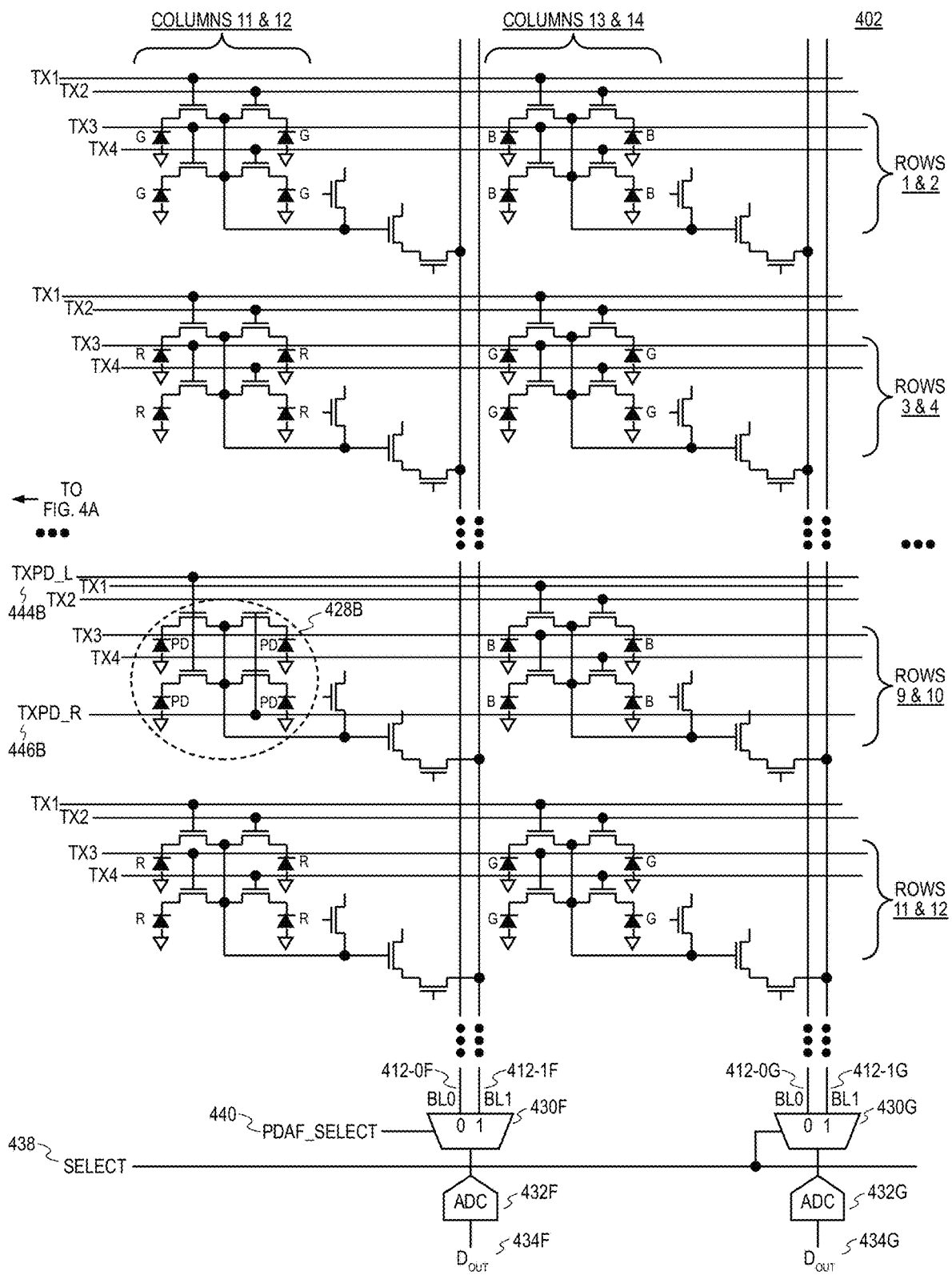
FIG. 4B illustrates another example of several rows and columns of pixel circuits included in another of pixel array with phase detection auto focus photodiodes in a lower half of the pixel array and interspersed among binned image sensing photodiodes in accordance with the teachings of the present invention.

FIG. 4B illustrates another example of several rows and columns of pixel circuits included in another portion of pixel array 402 with PDAF photodiodes in a lower half (e.g., second grouping of rows) of the pixel array 402 and interspersed among binned image sensing photodiodes in accordance with the teachings of the present invention. It is appreciated that the portion of pixel array 402 illustrated in FIG. 4B may be a portion from the same pixel array 402, but instead illustrating four columns of photodiodes that may correspond to columns 11 and 12, and columns 13 and 14 of the columns of photodiodes described in FIG. 2. However, the portion of the example pixel array 402 illustrated in FIG. 4B also illustrates eight rows of photodiodes that may correspond to rows 1 and 2, rows 3 and 4, rows 9 and 10, and rows 11 and 12 of the rows of photodiodes, as also described in FIG. 2. Therefore, it is appreciated that the pixel circuits illustrated in FIG. 4B may also be examples of the pixel circuits 314 of FIG. 3, or examples of one of the pixel circuits 214A, 214B included in pixel array 202 as shown in FIG. 2, or an example of one of the pixel circuits 114 included in pixel array 102 as shown in FIG. 1, and that similarly named and numbered elements described above are coupled and function similarly below.

Similar to the example described in FIG. 4A, the example depicted in FIG. 4B shows that the 2×2 groupings of image sensing photodiodes in columns 11 and 12 in rows 3 and 4, and in rows 11 and 12 are configured to be illuminated with red (R) light. Similarly, the 2×2 groupings of image sensing photodiodes in columns 11 and 12 in rows 1 and 2, and in columns 13 and 14 in rows 3 and 4, and in rows 11 and 12 are configured to be illuminated with green (G) light. Similarly, the 2×2 groupings of image sensing photodiodes in columns 13 and 14 in rows 1 and 2, and in rows 9 and 10 are configured to be illuminated with blue (B) light. As shown in the depicted example, it is appreciated that all of the transfer transistors of the image sensing pixel circuits of the same rows are coupled to be controlled with the same transfer transistor control signals TX1, TX2, TX3, and TX4.

As such, when the normal image sensing photodiodes of the image sensing pixel circuits are read out, the same transfer transistor control signals TX1, TX2, TX3, and TX4 are configured to control the transfer transistors to transfer charge from the respective photodiodes to the floating diffusion together for all of the normal image sensing pixel circuits that are in the same rows as described in detail above in FIG. 3 and in FIG. 4A.

Continuing with the example depicted in FIG. 4B, there is a second PDAF pixel circuit including the 2×2 grouping of PDAF photodiodes in columns 11 and 12 in rows 9 and 10, which are disposed under a PDAF microlens 428B. It is noted that the transfer transistors of the second PDAF pixel circuit are also separately controlled from the transfer transistors included in the normal image sensing pixel circuits described above. Instead, the transfer transistors of the second PDAF pixel circuit are configured to be controlled in response to PDAF transfer transistor control signals TXPD_L 444B and TXPD_R 446B instead of being controlled by the normal image sensing transfer transistor control signals TX1, TX2, TX3, and TX4. Therefore, it is appreciated that the PDAF photodiodes included in the 2×2 grouping of PDAF photodiodes in columns 11 and 12 in rows 9 and 10 are controlled and read out independently from the image sensing photodiodes that are controlled or read out in response to the normal image sensing transfer transistor control signals TX1, TX2, TX3, and TX4.

In one example, it is noted that the second PDAF pixel circuit including the 2×2 grouping of PDAF photodiodes in columns 11 and 12 in rows 9 and 10 is configured to be read out simultaneously with the readout of the first PDAF pixel circuit including the 2×2 grouping of PDAF photodiodes in columns 3 and 4 in rows 1 and 2, as described in FIG. 4A. As such, referring back to the example in FIG. 4B, it is noted that the first PDAF readout may be performed by reading out the left half PDAF photodiodes (e.g., the PDAF photodiodes column 11, rows 9 and 10) in response to the PDAF transfer transistor control signal TXPD_L 444B, and then the second PDAF readout may be performed by reading out the right half PDAF photodiodes (e.g., the PDAF photodiodes in column 12, rows 9 and 10) in response to the PDAF transfer transistor control signal TXPD_R 446B.

Similar to the example depicted in FIG. 4A, the column of pixel circuits in FIG. 4B that includes columns 11 and 12 of the photodiodes is coupled to a third bitline pair, which includes a first bitline BL0 412-0F and a second bitline BL1 412-1F. The column of pixel circuits that includes columns 13 and 14 of the photodiodes are coupled to a fourth bitline pair, which includes a first bitline BL0 412-0G and a second bitline BL1 412-1G. Similar to the examples depicted in FIG. 2 and FIG. 4A, rows 1 through 8 of the photodiodes are included in the first grouping of rows (e.g., 248 in FIG. 2) of pixel array 402, and rows 9 through 16 of the photodiodes are included in the second grouping of rows (e.g., 250) of pixel array 402. As such, the source follower transistors in the pixel circuits in the first grouping of rows (e.g., rows 1 and 2, and rows 3 and 4 in FIG. 4B) are coupled to the first bitlines BL0 412-0F and BL0 412-0G of the respective bitline pairs. Similarly, the source follower transistors in the pixel circuits in the second grouping of rows (e.g., rows 9 and 10, and rows 11 and 12 in FIG. 4A) are coupled to the second bitlines BL1 412-1F and BL1 412-1G of the respective bitline pairs. As such, it is noted that the second PDAF pixel circuit, which includes the PDAF photodiodes in columns 11 and 12 and rows 9 and 10, is therefore located in the second grouping of rows.

Similar to the example depicted in FIG. 4A, the example depicted in FIG. 4B also shows that there is a plurality of multiplexers, which includes multiplexer 430F and multiplexer 430GC. Each multiplexer 430F, 430G is coupled to a respective bitline pair as shown. In particular, the example depicted in FIG. 4B shows that multiplexer 430F includes a first multiplexer input coupled to receive first bitline BL0 412-0F, and a second multiplexer input coupled to receive second bitline BL1 412-1F from the column of pixel circuits that include the photodiodes in columns 11 and 12 of pixel array 402. Similarly, multiplexer 430G includes a first multiplexer input coupled to receive first bitline BL0 412-0G, and a second multiplexer input coupled to receive second bitline BL1 412-1G from the column of pixel circuits that include the photodiodes in columns 13 and 14 of pixel array 402. As shown in the example, each of the multiplexers, including multiplexer 430B and 430C, includes a select input.

One difference between the examples illustrated in FIG. 4A and in FIG. 4B is that the multiplexer 430F in FIG. 4B is a PDAF multiplexer because it is coupled to the second PDAF pixel circuit that includes the PDAF photodiodes in columns 11 and 12 and rows 9 and 10, which is in the second grouping of rows (e.g., 250 in FIG. 2) or in the lower half of the pixel array 402. Accordingly, in order to read out the second PDAF pixel circuit, which includes the PDAF photodiodes in columns 11 and 12 and rows 9 and 10, simultaneously with the first PDAF pixel circuit, which includes the PDAF photodiodes in columns 3 and 4 and rows 1 and 2 as described in FIG. 4A, the PDAF multiplexer 430F is coupled to receive a PDAF select signal 440 at the select input of PDAF multiplexer 430F, while the remaining multiplexers, including multiplexer 430B, are coupled to receive the select signal 438 at their respective select inputs.

As will be described in greater detail below, in operation when both the first PDAF pixel circuit and the second PDAF pixel circuit are configured to be read out simultaneously, the select signal 438 is configured to control multiplexer 430B to select the first bitline BL0 412-0B as shown in FIG. 4A while the PDAF select signal 440 is configured to control the PDAF multiplexer 430F to select the second bitline BL1 412-1F as shown in FIG. 4B to read out the first and second PDAF pixel circuits at the same time. However, during the read out of normal image sensing pixel circuits, the select signal 438 and the PDAF select signal 440 are substantially the same so that all normal image sensing pixel circuits in the same rows in either the first grouping of rows ((e.g., rows 1 through 8) of pixel array 402 or the second grouping of rows (e.g., rows 9 through 16) of pixel array 402 can be read out simultaneously through either the respective first bitlines BL0 or second bitlines BL1.

Similar to the example described in FIG. 4A, the example depicted in FIG. 4B also shows that there is a plurality of analog to digital converters (ADCs), which include ADC 432F and ADC 432G. Each ADC is coupled to the output of a respective multiplexer 430F and 430G. In operation, each ADC 432F, 432G is configured to perform an analog to digital conversion of the analog output received from respective multiplexers 430G, 430G to generate respective digital outputs $D_{OUT}$ 434F, $D_{OUT}$ 434G as shown.

Figure 5:
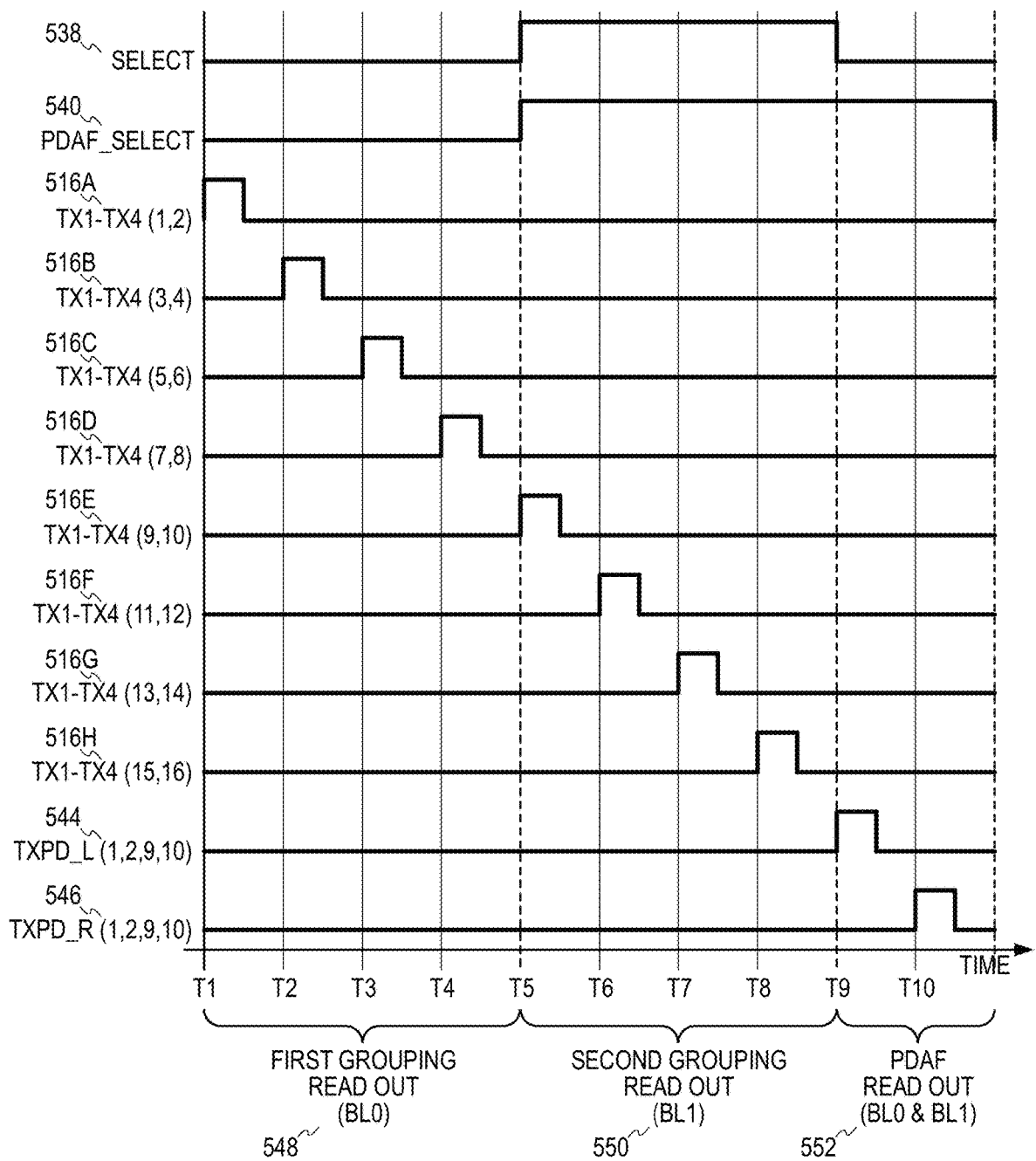
FIG. 5 illustrates one example timing diagram illustrating various signals in a imaging system with a pixel array including phase detection auto focus photodiodes interspersed among binned image sensing photodiodes in accordance with the teachings of the present invention.

FIG. 5 illustrates one example timing diagram 542 illustrating various signals in an imaging system with a pixel array including phase detection auto focus photodiodes interspersed among binned image sensing photodiodes in accordance with the teachings of the present invention. It is appreciated that the waveforms illustrated in FIG. 5 may be examples of waveforms found in pixel array 402 of FIGS. 4A-4B, and/or in pixel array 202 of FIG. 2, and/or imaging system 100 of FIG. 1, and/or the signals described in pixel circuit 314 illustrated in FIG. 3, and that similarly named and numbered elements referenced below are coupled and function similar to as described above.

For instance, in the example timing diagram 542 depicted in FIG. 5, it is assumed that the pixel array includes a plurality of pixel circuits arranged into rows and columns in a pixel array such as for example pixel array 202 of FIG. 2 or pixel array 402 of FIGS. 4A-4B, in which there are 16 rows and 16 columns of photodiodes arranged in binned groupings. In the example, a first grouping of rows includes the upper half of the rows of the pixel array, and a second grouping of rows includes the lower half of rows in the pixel array. The pixel circuits include 2×2 groupings of binned image sensing photodiodes as well as a first PDAF pixel circuit including at least a first pair of PDAF photodiodes included in the first grouping of rows, and a second PDAF pixel circuit in a different column including at least a second pair of PDAF photodiodes included in the second grouping of rows, as described in the examples depicted above in FIG. 2 and/or FIGS. 4A-4B.

As shown in the example depicted in FIG. 5, during the period between time T1 and time T5, both the PDAF select signal 540 and the select signal 538 are at a logic low level, which configures the PDAF multiplexer (e.g., 430F) and the remaining multiplexers (e.g., 430B, 430C, 430G) to select the first bitline BL0 to read out the normal image sensing pixel circuits from the first grouping of rows from the pixel array in accordance the teachings of the present invention. Furthermore, the PDAF transfer transistor control signals TXPD_L 544 and TXPD_R 546 remain off during the period between time T1 and time T5. As such, the normal image sensing pixel circuits in the first grouping of rows (e.g., rows 1-8 of the pixel array) can be read out through the first bitlines BL0 during the period between time T1 and time T5.

As such, FIG. 5 shows that at time T1, the normal image sensing transfer transistor control signals TX1-TX4 516A are pulsed to read out the normal imaging pixel circuits that include photodiodes from rows 1 and 2 of the pixel array. At time T2, the normal image sensing transfer transistor control signals TX1-TX4 516B are pulsed to read out the normal imaging pixel circuits that include photodiodes from rows 3 and 4 of the pixel array. At time T3, the normal image sensing transfer transistor control signals TX1-TX4 516C to read out the normal imaging pixel circuits that include photodiodes from rows 5 and 6 of the pixel array. At time T4, the normal image sensing transfer transistor control signals TX1-TX4 516D to read out the normal imaging pixel circuits that include photodiodes from rows 7 and 8 of the pixel array.

Next, during the time period between time T5 and time T9, both the PDAF select signal 540 and the select signal 538 transition to a logic high level, which configures the PDAF multiplexer (e.g., 430F) and the remaining multiplexers (e.g., 430B, 430C, 430G) to select the second bitline BL1 to read out the normal image sensing pixel circuits from the second grouping of rows from the pixel array in accordance the teachings of the present invention. Furthermore, the PDAF transfer transistor control signals TXPD_L 544 and TXPD_R 546 remain off during the period between time T5 and time T9. As such, the normal image sensing pixel circuits in the second grouping of rows (e.g., rows 9-16 of the pixel array) can be read out through the second bitlines BL1 during the period between time T5 and time T9.

As such, FIG. 5 shows that at time T5, the normal image sensing transfer transistor control signals TX1-TX4 516E are pulsed to read out the normal imaging pixel circuits that include photodiodes from rows 9 and 10 of the pixel array. At time T6, the normal image sensing transfer transistor control signals TX1-TX4 516F are pulsed to read out the normal imaging pixel circuits that include photodiodes from rows 11 and 12 of the pixel array. At time T7, the normal image sensing transfer transistor control signals TX1-TX4 516G to read out the normal imaging pixel circuits that include photodiodes from rows 13 and 14 of the pixel array. At time T8, the normal image sensing transfer transistor control signals TX1-TX4 516H to read out the normal imaging pixel circuits that include photodiodes from rows 15 and 16 of the pixel array.

Next, during the time period beginning at time T9 and the time period beginning at time T10, the first PDAF pixel circuit, which includes photodiodes at columns 3 and 4 and rows 1 and 2 in the first grouping of rows, and the second PDAF pixel circuit, which includes photodiodes at columns 11 and 12 and rows 9 and 10 in the second grouping of rows, are configured to be read out simultaneously through the first bitline BL0 412-0B through multiplexer 430B and through the second bitline BL1 412-1F through the PDAF multiplexer 430F, respectively.

Accordingly, the select signal 538 transitions back to a logic low level during the time period beginning at time T9 and the time period beginning at time T10 to control multiplexer 430B to select the first bitline BL0 412-0B to enable the readout of the first PDAF pixel circuit that includes photodiodes in rows 1 and 2. However, FIG. 5 shows that the PDAF select signal 540 remains at the logic high level during the time period beginning at time T9 and the time period beginning at time T10 to control the PDAF multiplexer 430F to select the second bitline BL1 412-1F to enable the readout of the second PDAF pixel circuit that includes photodiodes in rows 9 and 10.

As such, FIG. 5 shows that at time T9, a first half PDAF readout occurs with the left half of the PDAF transfer transistor control signals TXPD_L 544 being pulsed while the right half of the PDAF transfer transistor control signals TXPD_R 546 remain off to read out the left half of the first and second PDAF pixel circuits.

Next, at time T10, a second half PDAF readout occurs with the right half of the PDAF transfer transistor control signals TXPD_R 546 being pulsed while the left half of the PDAF transfer transistor control signals TXPD_L 546 remain off to read out the right half of the first and second PDAF pixel circuits.

In one example, after the first and second PDAF pixel circuits have been read out after time T10, the signals shown in FIG. 5 may loop back to the waveforms as shown beginning at time T1 to read out the normal image signals and PDAF signals again from the pixel array.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging device, comprising:
   a plurality of pixel circuits arranged into rows and columns in a pixel array, wherein the rows in the pixel array include a first grouping of rows and a second grouping of rows;
   a plurality of photodiodes included in each one of the plurality of pixel circuits in the pixel array, wherein the plurality of photodiodes in the pixel array include image sensing photodiodes and phase detection autofocus (PDAF) photodiodes, wherein the plurality of pixel circuits includes a first PDAF pixel circuit including at least a first pair of PDAF photodiodes included in the first grouping of rows, and a second PDAF pixel circuit including at least a second pair of PDAF photodiodes included in the second grouping of rows;
   a plurality of bitline pairs, wherein each bitline pair is coupled to a respective column of the pixel array, wherein said each bitline pair includes a first bitline coupled to the first grouping of rows of the respective column of the pixel array, and a second bitline coupled to the second grouping of rows of the respective column of the pixel array; and
   a plurality of multiplexers, wherein each multiplexer has a select input configured to select one of respective first and second multiplexer inputs coupled to respective first and second bitlines of a respective bitline pair, wherein the plurality of multiplexers includes a PDAF multiplexer coupled to the second PDAF pixel circuit though a respective bitline pair, wherein the select input of the PDAF multiplexer is coupled to receive a PDAF select signal, wherein the select input of remaining multiplexers of the plurality of multiplexers are coupled to receive a select signal.

2. The imaging device of claim 1, further comprising a plurality of analog to digital converters (ADC), wherein each ADC is coupled to an output of a respective one of the plurality of multiplexers.

3. The imaging device of claim 1, wherein the first grouping of rows includes rows in an upper half of the pixel array, wherein the second grouping of rows includes rows in a lower half of the pixel array.

4. The imaging device of claim 1, wherein the first and second PDAF pixel circuits are interspersed in different columns among pixel circuits that include image sensing photodiodes in the pixel array.

5. The imaging device of claim 4, further comprising a color filter array disposed over the image sensing photodiodes of the pixel circuits that include image sensing photodiodes, wherein the color filter array includes a plurality of color filters arranged in a Bayer pattern over the image sensing photodiodes of the pixel circuits that include image sensing photodiodes.

6. The imaging device of claim 5, wherein the image sensing photodiodes of the pixel circuits that include image sensing photodiodes are arranged in 2×2 binned groupings, wherein each image sensing photodiode of each 2×2 binned grouping is configured to be illuminated with incident light through respective color filters of the plurality of color filters having a same color.

7. The imaging device of claim 6, wherein the first pair of PDAF photodiodes is included in a first 2×2 grouping of PDAF photodiodes included in the first PDAF pixel circuit, and wherein the second pair of PDAF photodiodes is included in a second 2×2 grouping of PDAF photodiodes included in the second PDAF pixel circuit.

8. The imaging device of claim 7, wherein the first 2×2 grouping of PDAF photodiodes is configured to be illuminated through a first PDAF microlens, wherein the second 2×2 grouping of PDAF photodiodes is configured to be illuminated through a second PDAF microlens.

9. The imaging device of claim 7, wherein the select signal is configured to select a respective first bitline coupled to the first PDAF pixel circuit from the first grouping of rows in the pixel array, and the PDAF select signal is configured to select a respective second bitline coupled to the second PDAF pixel circuit from the second grouping of rows in the pixel array to read out the first PDAF pixel circuit and the second PDAF pixel circuit from the pixel array simultaneously.

10. The imaging device of claim 9, wherein the PDAF select signal and the select signal are configured to be substantially equal to read out the pixel circuits that include image sensing photodiodes from a same row of the pixel array simultaneously.

11. The imaging device of claim 10, wherein each one of the plurality of pixel circuits further includes a plurality of transfer transistors coupled between respective photodiodes and a floating diffusion of said each one of the plurality of pixel circuits.

12. The imaging device of claim 11, wherein each one of the plurality of transfer transistors of the pixel circuits including image sensing photodiodes of a same row of the pixel array is configured to turn on and off substantially simultaneously to transfer image charge from said respective photodiodes to the floating diffusion.

13. The imaging device of claim 12, wherein a first half of the plurality transfer transistors of pixel circuits including PDAF photodiodes are configured to be turned on while a second half of the plurality transfer transistors of pixel circuits including PDAF photodiodes are configured to be turned off for a first half PDAF readout,
wherein the second half of the plurality transfer transistors of pixel circuits including PDAF photodiodes are configured to be turned on while the first half of the plurality transfer transistors of pixel circuits including PDAF photodiodes are configured to be turned off for a second half PDAF readout.

14. The imaging device of claim 13, wherein the plurality transfer transistors of pixel circuits including PDAF photodiodes are configured to be turned off when the pixel circuits including image sensing photodiodes are read out.

15. The imaging device of claim 11, wherein each one of the plurality of pixel circuits further includes:
a reset transistor coupled between the floating diffusion and a voltage supply;
a source follower transistor having a gate coupled to the floating diffusion and a source coupled to one of the plurality of bitline pairs; and
a row select transistor coupled to the source follower transistor, wherein the source follower transistor and the row select transistor are coupled between the voltage supply and said one of the plurality of bitline pairs.

16. An imaging system, comprising:
a plurality of pixel circuits arranged into rows and columns in a pixel array, wherein the rows in the pixel array include a first grouping of rows and a second grouping of rows;
a plurality of photodiodes included in each one of the plurality of pixel circuits in the pixel array, wherein the plurality of photodiodes in the pixel array include image sensing photodiodes and phase detection autofocus (PDAF) photodiodes, wherein the plurality of pixel circuits includes a first PDAF pixel circuit including at least a first pair of PDAF photodiodes included in the first grouping of rows, and a second PDAF pixel circuit including at least a second pair of PDAF photodiodes included in the second grouping of rows;
a plurality of bitline pairs, wherein each bitline pair is coupled to a respective column of the pixel array, wherein said each bitline pair includes a first bitline coupled to the first grouping of rows of the respective column of the pixel array, and a second bitline coupled to the second grouping of rows of the respective column of the pixel array;
a control circuit coupled to the pixel array to control operation of the pixel array; and
a readout circuit coupled to the pixel array to read out signals from the pixel array through the plurality of bitline pairs, wherein the readout circuit includes a plurality of multiplexers, wherein each multiplexer has a select input configured to select one of respective first and second multiplexer inputs coupled to respective first and second bitlines of a respective bitline pair, wherein the plurality of multiplexers includes a PDAF multiplexer coupled to the second PDAF pixel circuit though a respective bitline pair, wherein the select input of the PDAF multiplexer is coupled to receive a PDAF select signal, wherein the select input of remaining multiplexers of the plurality of multiplexers are coupled to receive a select signal.

17. The imaging system of claim 16, further comprising function logic coupled to the readout circuit to store digital representations of the signals from the pixel array.

18. The imaging system of claim 16, further comprising a plurality of analog to digital converters (ADC), wherein each ADC is coupled to an output of a respective one of the plurality of multiplexers.

19. The imaging system of claim 16, wherein the first grouping of rows includes rows in an upper half of the pixel array, wherein the second grouping of rows includes rows in a lower half of the pixel array.

20. The imaging system of claim 16, wherein the first and second PDAF pixel circuits are interspersed in different columns among pixel circuits that include image sensing photodiodes in the pixel array.

21. The imaging system of claim 20, further comprising a color filter array disposed over the image sensing photodiodes of the pixel circuits that include image sensing photodiodes, wherein the color filter array includes a plurality of color filters arranged in a Bayer pattern over the image sensing photodiodes of the pixel circuits that include image sensing photodiodes.

22. The imaging system of claim 21, wherein the image sensing photodiodes of the pixel circuits that include image sensing photodiodes are arranged in 2×2 binned groupings, wherein each image sensing photodiode of each 2×2 binned grouping is configured to be illuminated with incident light through respective color filters of the plurality of color filters having a same color.

23. The imaging system of claim 22, wherein the first pair of PDAF photodiodes is included in a first 2×2 grouping of PDAF photodiodes included in the first PDAF pixel circuit, and wherein the second pair of PDAF photodiodes is included in a second 2×2 grouping of PDAF photodiodes included in the second PDAF pixel circuit.

24. The imaging system of claim 23, wherein the first 2×2 grouping of PDAF photodiodes is configured to be illuminated through a first PDAF microlens, wherein the second 2×2 grouping of PDAF photodiodes is configured to be illuminated through a second PDAF microlens.

25. The imaging system of claim 23, wherein the select signal is configured to select a respective first bitline coupled to the first PDAF pixel circuit from the first grouping of rows in the pixel array, and the PDAF select signal is configured to select a respective second bitline coupled to the second PDAF pixel circuit from the second grouping of rows in the pixel array to read out the first PDAF pixel circuit and the second PDAF pixel circuit from the pixel array simultaneously.

26. The imaging system of claim 25, wherein the PDAF select signal and the select signal are configured to be substantially equal to read out the pixel circuits that include image sensing photodiodes from a same row of the pixel array simultaneously.

27. The imaging system of claim 26, wherein each one of the plurality of pixel circuits further includes a plurality of transfer transistors coupled between respective photodiodes and a floating diffusion of said each one of the plurality of pixel circuits.

28. The imaging system of claim 27, wherein each one of the plurality of transfer transistors of the pixel circuits including image sensing photodiodes of a same row of the pixel array is configured to turn on and off substantially simultaneously to transfer image charge from said respective photodiodes to the floating diffusion.

29. The imaging system of claim 28, wherein a first half of the plurality transfer transistors of pixel circuits including PDAF photodiodes are configured to be turned on while a second half of the plurality transfer transistors of pixel circuits including PDAF photodiodes are configured to be turned off for a first half PDAF readout,
wherein the second half of the plurality transfer transistors of pixel circuits including PDAF photodiodes are configured to be turned on while the first half of the plurality transfer transistors of pixel circuits including PDAF photodiodes are configured to be turned off for a second half PDAF readout.

30. The imaging system of claim 28, wherein the plurality transfer transistors of pixel circuits including PDAF photodiodes are configured to be turned off when the pixel circuits including image sensing photodiodes are read out.

31. The imaging system of claim 27, wherein each one of the plurality of pixel circuits further includes:
a reset transistor coupled between the floating diffusion and a voltage supply;
a source follower transistor having a gate coupled to the floating diffusion and a source coupled to one of the plurality of bitline pairs; and
a row select transistor coupled to the source follower transistor, wherein the source follower transistor and the row select transistor are coupled between the voltage supply and said one of the plurality of bitline pairs.

* * * * *